(12) United States Patent
Ota et al.

(10) Patent No.: US 8,377,338 B2
(45) Date of Patent: Feb. 19, 2013

(54) COPPER POWDER FOR CONDUCTIVE PASTE AND CONDUCTIVE PASTE

(75) Inventors: Koyu Ota, Hida (JP); Touru Kurimoto, Hida (JP); Yoshiaki Uwazumi, Hida (JP); Koichi Miyake, Ageo (JP); Katsuhiko Yoshimaru, Tokyo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 237 days.

(21) Appl. No.: 12/904,570

(22) Filed: Oct. 14, 2010

(65) Prior Publication Data

US 2011/0031448 A1     Feb. 10, 2011

(51) Int. Cl.
 *H01B 1/08* (2006.01)
(52) U.S. Cl. .............................. 252/512; 75/314; 75/247
(58) Field of Classification Search .................. 252/512; 75/314, 247
See application file for complete search history.

(56) References Cited

U.S. PATENT DOCUMENTS

| | | | | |
|---|---|---|---|---|
| 4,400,214 A | * | 8/1983 | Ogawa et al. | 106/1.13 |
| 5,198,154 A | * | 3/1993 | Yokoyama et al. | 252/514 |
| 6,214,259 B1 | * | 4/2001 | Oda et al. | 252/500 |

FOREIGN PATENT DOCUMENTS

| | | | |
|---|---|---|---|
| JP | 60-200928 | * | 10/1985 |
| JP | 10152630 A | | 6/1998 |
| JP | 2005129424 A | | 5/2005 |

* cited by examiner

*Primary Examiner* — Mark Kopec
(74) *Attorney, Agent, or Firm* — The Webb Law Firm

(57) ABSTRACT

Copper powder is provided, which, while having fine granularity, does not loose either resistance to oxidation or balance in conductivity, and furthermore, copper powder for conductive paste in which variations in shape and granularity are small and having a low concentration in oxygen content. The copper powder for conductive paste contains 0.07 to 10 atomic % Al inside each copper particle in the powder.

11 Claims, No Drawings

COPPER POWDER FOR CONDUCTIVE PASTE AND CONDUCTIVE PASTE

TECHNICAL FIELD

The present invention relates to a copper powder for a conductive paste and a conductive paste using the same, in particular, to a copper powder suitable for conducting materials, or the like, of conductive paste for use in forming conductor circuits by the additive method of screen printing, or for use in various electrical contact members such as for external electrode of multi layered ceramic capacitors (MLCC), and to conductive paste using the same.

TECHNICAL BACKGROUND

From the ease of handling thereof, copper powder has been utilized widely in prior art as conducting materials of conductive paste for use in forming conductor circuits by the additive method of screen printing, or for use in various electrical contact members such as for an external electrode of multi layered ceramic capacitors (MLCC).

The above conductive paste can be obtained, for instance, by mixing copper powder with resin such as epoxy resin and various additives such as curing agents thereof, and kneading. The copper powder used in so doing can be fabricated by the wet reduction method (precipitated method), in which deposition is caused by reducing agents from solutions, or the like, containing copper salt, the gas phase reduction method, in which copper salt is thermally gasified and reduced in gas phase, the atomizing method, in which molten copper metal is rapidly cooled with coolant such as inert gas or water to be powderized, and the like.

Among the fabrication methods for copper powder such as those described above, the atomizing method, compared to the generally and widely used wet reduction method, has the advantages of being capable of reducing the residual concentration of impurities in the obtained copper powder, at the same time as allowing less pores to be present in the obtained particle of copper powder throughout from the surface to the interior. Therefore, when used in conducting materials of conductive paste, copper powder fabricated by the atomizing method has the advantages of being capable of reducing the amount of gas generation during paste curing, at the same time as being capable of broadly suppressing the progression of oxidation.

However, while copper powder is suitable in conducting materials of conductive paste owing to high conductivity thereof, as the granularity becomes finer, resistance to oxidation becomes poorer, and in order to improve this, measures have been adopted such as coating the particle surface with silver (Patent Reference 1), which has resistance to oxidation, or coating with an inorganic oxide (Patent Reference 2).

[Patent Reference 1] Japanese Patent Application Laid-open No. H10-152630
[Patent Reference 2] Japanese Patent Application Laid-open No. 2005-129424

Recently, refinement has been sought in forming a circuit with a conductive paste, or the like, and inevitably, refinement has been also sought of the granularity of conducting powder used in conductive paste. Simultaneously, in maintaining stability and reliability of paste properties, variations in shape and granularity have to be small, and conductivity must not be lost. Then, if only an improvement of resistance to oxidation is to be taken, addressing the issue is possible with the technique of Patent Reference 1 or 2, or the like.

However, with the technique of Patent Reference 1 or 2, owing to a dependency on coating techniques, problems arise, not only of requiring large amounts of constituents other than copper that lose conductivity, but also of detachment from the core material copper powder particle. In addition, while it is desirable in reducing the variations in shape and granularity that the constitutive particles are uniformly homogeneous and, furthermore, have low concentration in oxygen content, none that provides satisfaction has been found for such copper powder.

It is an object of the present invention to provide copper powder which, while having fine granularity, does not lose either resistance to oxidation or balance in conductivity, and furthermore, copper powder for conductive paste in which variations in shape and granularity are small and having low concentration in oxygen content.

SUMMARY OF THE INVENTION

As a result of earnest studies in order to address the above issues, the present inventors have discovered that when a specific amount of Al was included in the particle of copper powder, the above problems were resolved, and completed the present invention.

That is to say, the copper powder for conductive paste of the present invention contains 0.07 to 10 atomic % Al inside a particle.

In addition, 0.01 to 0.3 atomic % P (phosphorus) may be contained inside a particle and it is desirable that Al/P (atomic ratio) is 4 to 200.

Then, one that has been fabricated by the atomizing method is desirable.

In addition, it is desirable that the difference between 245° C. and 600° C. in weight change ratio (Tg(%))/specific surface area (SSA) is 1 to 30%/m$^2$/cm$^3$.

Another mode of the present invention is conductive paste containing the above-mentioned copper powder for conductive paste.

The copper powder for conductive paste of the present invention, while being of fine granularity, has excellent resistance to oxidation and balanced conductivity. Furthermore, since variations in shape and granularity are small and concentration in oxygen content is low, it can be applied extremely satisfactorily to conducting materials of conductive paste, or the like, for use in forming conductor circuits by the additive method of screen printing, or for use in various electrical contact members such as of an external electrode of multi layered ceramic capacitors.

BEST MODE FOR CARRYING OUT THE INVENTION

Embodiments of the copper powder for conductive paste according to the present invention will be described; however, the present invention is not to be limited to the following embodiments.

The copper powder for conductive paste according to the present invention contains 0.07 to 10 atomic % Al inside a particle.

What is important here is not merely that Al is contained, but that a specific amount is contained inside a particle.

That is to say, with copper powder coating or attached to the surface of copper powder particles, of which the core materials are various compounds such as Al$_2$O$_3$, described widely in prior art techniques represented by the above patent references, although there is effectiveness for improving resistance to oxidation, copper powder sought by the present patent application having fine granularity and not losing, in addition to resistance to oxidation, the balance in conductivity cannot be obtained.

It should be noted that the Al constituent contained in the copper powder for conductive paste according to the present invention is preferably uniformly distributed in the metal phase inside a particle, and is assumed to be present inside the particle as an alloy constituent.

In addition, the content in Al is 0.07 to 10 atomic %, preferably 0.5 to 5 atomic % and more preferably 0.5 to 3 atomic %. If this content is less than 0.07 atomic %, the effects sought by the present invention cannot be expected. In addition, if 10 atomic % is exceeded, not only the conductivity is lost, no effect commensurate with the addition is obtained.

In addition, it is adequate for the copper powder for conductive paste according to the present invention to contain, in addition to Al, preferably 0.01 to 0.3 atomic % and more preferably 0.02 to 0.1 atomic % P (phosphorus) inside a particle internal. If Al and P co-exist inside a copper powder and are in such ranges of specific amounts, the powder has granularity fineness and resistance to oxidation without losing conductivity, furthermore, the variations in shape and granularity are small and the character of low concentration in oxygen content is increased.

In addition, copper powder for conductive paste according to the present invention has an Al/P (atomic ratio) of preferably 4 to 200 and more preferably 10 to 100. If the ratio Al/P is in such a range, balancing the characters of granularity fineness, resistance to oxidation, high conductivity, small variations in shape and granularity and low concentration in oxygen content is facilitated.

In addition, for the copper powder for conductive paste according to the present invention, even if obtained by the wet reduction method, effects as such can be expected. However it is desirable if obtained by the atomizing method, when advantages are considered, such as, the particle shape is symmetric and generation of gas is low when used as a conducting paste.

Regarding the atomizing method, there are the gas atomizing method and the water atomizing method exist, and it is adequate to select the gas atomizing method if the well-proportioned in particle shape is intended, and water atomizing method if refinement of the particles is intended. In addition, among the atomizing methods, those fabricated by the high-pressure atomizing method are desirable. Copper powder obtained by such the high-pressure atomizing method is desirable as the particles are more well-proportioned or finer. Regarding the high-pressure atomizing method, in the water atomizing method, it is a method in which atomizing is with the water pressure on the order of 50 to 150 MPa, and in the gas atomizing method, it is a method in which atomizing is with a gas pressure on the order of 1.5 to 3 MPa.

In addition, it is desirable that the copper powder for conductive paste according to the present invention has a difference in weight change ratio (Tg(%))/specific surface area (SSA) (hereafter noted Δ(TG/SSA)) of preferably 1 to 30%/m$^2$/cm$^3$ and more preferably 1 to 25%/m$^2$/cm$^3$ as determined by the differential thermogravimetric (TGA) analyzer between 245° C. and 600° C.

According to this characteristic value of Δ(TG/SSA), it is possible to observe resistance to oxidation of the copper powder. In addition, the temperature region of 245° C. to 600° C. is the heating temperature region when using main conductive paste such as, for instance, electric conducting paste for use in firing external electrode of a ceramic capacitors, and having resistance to oxidation in this region is extremely important. If this Δ(TG/SSA) is in the above preferred range, resistance to oxidation is sufficiently exerted, and it is also suitable for maintaining high conductivity.

In addition, for the copper powder for conductive paste according to the present invention, by further adding at least one species or more element constituents among Ag, Ni, Si, Ti, Fe, Co, Cr, Mg, Mn, Mo, W, Ta, In, Zr, Nb, B, Ge, Sn, Zn, Bi and the like, the effect of improving the properties sought in a conductive paste can be increased, such as decreasing the melting point to improve sinter-ability, to begin with. While the amount of these elements added with respect to copper is suitably set from conducting characteristics according to the species of the element added, various other characteristics and the like, in general, they are on the order of 0.001 to 2% in mass.

In addition, it is desirable for the copper powder for conductive paste according to the present invention that the form thereof is granular, and in particular, it is more desirable if it is spherical. Here, granular refers to forms that are alike with aspect ratios (value from the division of the average long diameter by the average short diameter) on the order of 1 to 1.25, forms that are alike with aspect ratios on the order of 1 to 1.1 are particularly referred to as spherical. Note that a state in which the forms are not alike is referred to as irregular shape. Copper powder adopting such a granular form is extremely desirable, since there is little intertwining when used in conducting materials or the like of conductive paste, improving dispersibility inside the paste.

In addition, for the copper powder for conductive paste according to the present invention, if the variation coefficient (SD/D$_{50}$) is 0.2 to 0.6 as determined from the volume-converted 50% cumulative diameter D$_{50}$ and the standard deviation value SD measurable by, for instance, a laser diffraction/scattering particle size distribution analyzer or the like, it is extremely desirable since there is little variation in particle size distribution, allowing dispersibility in the paste to be improved when used in conducting materials or the like of conductive paste.

In addition, by having a number mean particle size of 0.5 to 50 μm, the copper powder for conductive paste according to the present invention becomes suitable to conducting material or the like of conductive paste for use in forming finer conductor circuits described previously.

In addition, by having concentration in oxygen content of 30 to 2500 ppm, the copper powder for conductive paste according to the present invention can ensure conductivity and becomes suitable to conducting materials or the like of conductive paste.

Hereafter, preferred concrete fabrication methods for copper powder for conductive paste according to the present invention will be described.

The copper powder for conductive paste of the present invention can be fabricated by adding to molten copper a predetermined amount of Al constituent in such a form as master alloy or compound, and then powderizing with the predetermined atomizing method.

According to the above fabrication method, copper powder which, while having fine granularity, does not lose either resistance to oxidation or balance in conductivity, and furthermore, copper powder in which variations in shape and granularity are small and having low concentration in oxygen content can be fabricated.

Although the reasons for this are not determined, it is assumed that, to an extent that conductivity is not lost, Al added to molten copper or copper alloy captures the oxygen generated in the copper powder particle, suppressing oxidation.

Further, it is assumed that when a P constituent is added in addition to the Al constituent, the surface tension of the melt at atomizing can be reduced, allowing the well-proportioned in particle shape and deoxygenation in the melt to be carried out effectively. For the addition of P constituent, similarly to the Al constituent, it suffices to add to molten copper a predetermined amount of P constituent in the form of master alloy or compound.

In addition, in the above fabrication method, for reasons explained earlier, it is desirable to adopt high-pressure atomizing method. However, since the yield rate of content in Al or P is sometimes low with the water atomizing method compared to the gas atomizing method, 1 to 10-fold amount in the case of Al and 1 to 100-fold amount in the case of P must be added with respect to the target net amount in the copper powder.

In addition, in the above fabrication method, after atomizing, a reduction treatment may be performed. By way of this reduction treatment, the oxygen concentration on the surface of the copper powder, which is susceptible to progression of oxidation, can be decreased further. Here, for the above reduction treatment, reduction by gas is desirable from the point of view of workability. While this gas for reduction treatment is not limited in particular, for instance, hydrogen gas, ammonia gas, butane gas and the like can be cited.

In addition, it is desirable that the reduction treatment is carried out at temperatures of 150° C. to 300° C., and it is more desirable in particular if it is carried out at temperatures of 170° C. to 210° C. The reasons being that, if the above-mentioned temperature is less than 150° C., the rate of reduction becomes slow, not allowing the effects of the treatment to be displayed fully, if the above-mentioned temperature exceeds 300° C., there is the danger of triggering aggregation and sintering of copper powder, and if the above-mentioned temperature is 170° C. to 210° C., aggregation and sintering of the copper powder can be suppressed with certainty while attempting an efficient decrease in oxygen concentration.

In addition, in the above fabrication method, after powderizing, it is desirable that sorting is performed. This sorting can be carried out readily by separating crude powder and fine powder from the obtained copper powder using appropriate sorting devices so that the target granularity becomes the center. Here, it is desirable to sort in such a way that the variation coefficient ($SD/D_{50}$) explained earlier is 0.2 to 0.6.

For conductive paste containing the copper powder for conductive paste of the present invention fabricated by mixing with copper powder as described above, various additives such as, for instance, a resin such as epoxy resin and a curing agents thereof, kneading and the like, since copper powder, while having fine granularity, has acquired resistance to oxidation and balanced conductivity, has little variation in shape and low concentration of oxygen content, it can be applied extremely satisfactory to conducting materials, or the like, of conductive paste used in forming conductor circuits by the additive method of screen printing, or used in various electrical contact members such as for an external electrode of multi layered ceramic capacitor (MLCC). In addition, copper powder for conductive paste of the present invention can also be used in multilayer via electric conduction, thermal via, electrode material, and the like.

Hereafter, the present invention will be described further in detail based on the following examples and comparative examples.

Example 1

The chamber of gas atomizing apparatus (NEVA-GP Model 2, manufactured by Nisshin Giken Corporation) and the interior of a raw-material fusion chamber were filled with argon gas and then the raw materials were heat fused in carbon crucible present inside the fusion chamber to obtain a melt (1.74 g metal aluminum was added into a melt of fused electric copper to obtain 800 g of melt, which was thoroughly stir-mixed). Thereafter, the melt was sprayed from a nozzle with an opening of 1.5 mm diameter at 1250° C. and 3.0 MPa to obtain copper powder containing aluminum inside a particle. Whereafter, by sieving with a 53 μm test sieve, the product under the sieve served as the final copper powder. The properties of the obtained copper powder are shown in Table 2.

Examples 2 to 4

Copper powders were obtained by carrying out similar operations to Example 1, except that amounts of metal aluminum added were modified as shown in Table 1.

Examples 5 to 10

Copper powders were obtained by carrying out similar operations to Example 1, except that, in addition to metal aluminum, copper-phosphorus master alloy (P grade: 15% in mass) was also added as shown in Table 1.

Comparative Examples 1 to 4

Copper powder was obtained by carrying out similar operations to Example 1, except that the amount of metallic aluminum and/or copper-phosphorus master alloy added were added as indicated in Table 1.

TABLE 1

| | Amount of P-Cu master alloy added (g) | Amount of Al added (g) |
|---|---|---|
| Example 1 | — | 1.74 |
| Example 2 | — | 6.81 |
| Example 3 | — | 0.34 |
| Example 4 | — | 34.06 |
| Example 5 | 1.30 | 1.70 |
| Example 6 | 1.30 | 6.81 |
| Example 7 | 1.30 | 10.22 |
| Example 8 | 1.30 | 3.41 |
| Example 9 | 0.26 | 1.70 |
| Example 10 | 0.26 | 6.81 |
| Comparative Example 1 | — | — |
| Comparative Example 2 | 1.30 | — |
| Comparative Example 3 | — | 0.24 |
| Comparative Example 4 | 1.30 | 0.24 |

In regard to copper powder obtained in the examples and the comparative examples, the properties were evaluated by the methods shown below. The results are indicated in Tables 2 to 6.

(a) Aluminum and Phosphorus Content

Samples were dissolved with acid and analyzed by ICP.

(b) Oxygen Concentration

Analyzing is carried out with an oxygen/nitrogen analyzer ("EMGA-520 (model number)", manufactured by Horiba). The results are shown in Table 2. Note that, in order to evaluate the deterioration of resistance to oxidation with the age, the oxygen concentration of samples respectively heated to 200° C. at 10° C./minute with an air flow rate of 8 L/minute using SK-8000 manufactured by Sanyo Seiko and then kept for one hour were also measured. The results are shown in Table 5.

(c) Δ(TG/SSA)

The difference in weight change ratio between 245° C. to 600° C. was determined by measuring Tg(%) at 40° C. to 600° C. with the simultaneous differential thermogravimetric analyzer (TG/DTA) (TG/DTA 6300 high-temperature model, manufactured by SII) (rate of temperature rise: 10° C./minute; air flow rate: 200 mL/minute). Meanwhile, the specific surface area was determined from the particle size distribution measured with the granularity analyzer (Microtrack Model MT-3000, manufactured by Nikkiso), and arithmetically from both numerical values. TG/SSA of Examples 1 to 10 and Comparative Examples 1 to 4 corresponding to the temperatures are shown in Table 3. In addition, the results of the division of the TG/SSA of Examples 1 to 10 and Comparative Examples 2 to 4 by the TG/SSA of pure copper powder (noted [Tg(%)/SSA]$_{Cu}$ in the Figure) of Comparative Example 1 are shown in Table 4.

(d) Particle Shape

Observation is carried out with a scanning electron microscope.

(e) $D_{50}$, SD and SD/$D_{50}$

A sample (0.2 g) was placed in pure water (100 ml) and irradiated with ultrasound (3 minutes) to be dispersed, then, the volume-converted 50% cumulative diameter $D_{50}$ and the standard deviation value SD as well as the variation coefficient (SD/$D_{50}$) were respectively determined with a particle size distribution analyzer ("Microtrack (product name) FRA (model number)", manufactured by Nikkiso).

(f) Powder Resistance

A measurement sample was formed by placing 15 g sample in a cylindrical container and compression forming with press pressure of $40 \times 10^6$ Pa (408 kgf/cm$^2$), and measurements were carried out with Loresta AP and Loresta PD-4 Model 1 (both manufactured by Mitsubishi Chemical Corporation).

TABLE 2

| | Content (atm %) | | Al/P (atm ratio) | Δ(TG/SSA) (%/m²/cm³) | Oxygen concentration (ppm) | Particle shape | D50 (μm) | SD (μm) | SD/D$_{50}$ |
|---|---|---|---|---|---|---|---|---|---|
| | P | Al | | | | | | | |
| Example 1 | — | 0.49 | — | 19.32 | 101.5 | Spherical | 34.26 | 16.84 | 0.49 |
| Example 2 | — | 2.05 | — | 18.12 | 60.1 | Spherical | 31.95 | 13.88 | 0.43 |
| Example 3 | — | 0.07 | — | 21.41 | 75.7 | Spherical | 34.01 | 17.03 | 0.50 |
| Example 4 | — | 8.72 | — | 1.18 | 73.3 | Spherical | 31.32 | 16.78 | 0.54 |
| Example 5 | 0.041 | 0.49 | 12.0 | 16.78 | 65.8 | Spherical | 30.22 | 13.28 | 0.44 |
| Example 6 | 0.050 | 2.00 | 40.0 | 16.47 | 74.6 | Spherical | 27.35 | 14.62 | 0.53 |
| Example 7 | 0.048 | 3.01 | 62.7 | 16.99 | 61.8 | Spherical | 33.45 | 16.72 | 0.50 |
| Example 8 | 0.064 | 9.14 | 142.8 | 0.94 | 71.7 | Spherical | 28.69 | 15.05 | 0.53 |
| Example 9 | 0.010 | 0.52 | 52.0 | 16.19 | 67.1 | Spherical | 28.16 | 12.73 | 0.45 |
| Example 10 | 0.010 | 1.98 | 198.0 | 14.96 | 68.3 | Spherical | 29.96 | 16.09 | 0.54 |
| Comparative Example 1 | — | — | — | 38.61 | 113.4 | Amorphous mixed with spherical | 33.66 | 21.38 | 0.64 |
| Comparative Example 2 | 0.050 | — | — | 32.49 | 78.8 | Spherical | 28.51 | 14.74 | 0.52 |
| Comparative Example 3 | — | 0.04 | — | 26.48 | 79.2 | Amorphous mixed with spherical | 35.48 | 20.90 | 0.59 |
| Comparative Example 4 | 0.051 | 0.04 | 1.4 | 28.83 | 74.7 | Spherical | 27.98 | 15.05 | 0.54 |

TABLE 3

| | TG/SSA(%/m²/cm³) | | | | | |
|---|---|---|---|---|---|---|
| | 200° C. | 245° C. | 300° C. | 400° C. | 500° C. | 600° C. |
| Example 1 | 0.411 | 1.152 | 1.647 | 3.716 | 6.360 | 20.471 |
| Example 2 | 0.450 | 0.742 | 1.263 | 3.176 | 4.720 | 18.861 |
| Example 3 | 0.335 | 1.128 | 3.023 | 3.945 | 7.971 | 22.537 |
| Example 4 | 0.338 | 0.481 | 0.679 | 1.043 | 1.341 | 1.665 |
| Example 5 | 0.440 | 0.767 | 1.070 | 2.533 | 4.910 | 17.545 |
| Example 6 | 0.422 | 0.652 | 0.962 | 2.060 | 4.092 | 17.121 |
| Example 7 | 0.494 | 0.712 | 1.049 | 2.039 | 3.510 | 17.703 |
| Example 8 | 0.396 | 0.506 | 0.704 | 0.969 | 1.134 | 1.447 |
| Example 9 | 0.591 | 0.981 | 1.328 | 3.016 | 5.725 | 17.166 |
| Example 10 | 0.418 | 0.657 | 1.019 | 2.237 | 4.067 | 15.619 |
| Comparative Example 1 | 0.239 | 1.247 | 4.324 | 15.838 | 28.166 | 39.854 |
| Comparative Example 2 | 0.560 | 1.325 | 2.093 | 4.644 | 11.582 | 33.811 |
| Comparative Example 3 | 0.436 | 1.042 | 3.985 | 13.390 | 20.300 | 27.524 |
| Comparative Example 4 | 0.580 | 1.226 | 1.973 | 4.395 | 11.364 | 30.058 |

TABLE 4

| | [TG/SSA]/[TG/SSA]$_{Cu}$ | | | | | |
|---|---|---|---|---|---|---|
| | 200° C. | 245° C. | 300° C. | 400° C. | 500° C. | 600° C. |
| Example 1 | 1.720 | 0.988 | 0.381 | 0.235 | 0.226 | 0.514 |
| Example 2 | 1.883 | 0.692 | 0.292 | 0.201 | 0.168 | 0.473 |
| Example 3 | 1.405 | 0.935 | 0.699 | 0.249 | 0.283 | 0.565 |
| Example 4 | 1.417 | 0.436 | 0.157 | 0.066 | 0.048 | 0.042 |
| Example 5 | 1.842 | 0.716 | 0.247 | 0.160 | 0.174 | 0.440 |
| Example 6 | 1.766 | 0.589 | 0.222 | 0.130 | 0.145 | 0.430 |
| Example 7 | 2.070 | 0.664 | 0.243 | 0.129 | 0.125 | 0.444 |
| Example 8 | 1.657 | 0.472 | 0.163 | 0.061 | 0.040 | 0.036 |
| Example 9 | 2.477 | 0.916 | 0.307 | 0.190 | 0.203 | 0.431 |
| Example 10 | 1.752 | 0.613 | 0.236 | 0.141 | 0.144 | 0.392 |
| Comparative Example 1 | 1 | 1 | 1 | 1 | 1 | 1 |

TABLE 4-continued

| | [TG/SSA]/[TG/SSA]$_{Cu}$ | | | | | |
|---|---|---|---|---|---|---|
| | 200° C. | 245° C. | 300° C. | 400° C. | 500° C. | 600° C. |
| Comparative Example 2 | 2.347 | 1.166 | 0.484 | 0.293 | 0.411 | 0.848 |
| Comparative Example 3 | 1.826 | 1.099 | 0.922 | 0.845 | 0.721 | 0.691 |
| Comparative Example 4 | 2.430 | 1.145 | 0.456 | 0.278 | 0.403 | 0.754 |

As shown in Table 3 and Table 4, compared to the comparative examples not containing aluminum or not containing aluminum and phosphorus, the copper powders of the examples were found to have excellent resistance to oxidation, and in particular were excellent in the temperature region of 245 to 600° C.

In addition, as shown in Table 5, when maintained for a long period of time under the environment prone to oxidation, copper powder of the examples had remarkably excellent resistance to oxidation with the age compared to copper powder of the comparative examples.

TABLE 5

| | Content (atm %) | | Amount of powder oxygen | |
|---|---|---|---|---|
| | P | Al | Before temperature rise | After one hour hold |
| Example 1 | — | 0.49 | 101.5 | 1556.0 |
| Example 5 | 0.041 | 0.49 | 65.8 | 797.8 |
| Comparative Example 1 | — | — | 113.4 | 3690.9 |
| Comparative Example 2 | 0.050 | — | 78.8 | 3095.6 |

In addition, as shown in Table 6, compared to the copper powder of the comparative examples, copper powder of the examples were confirmed to have satisfactory conductivity with not much variations in volume resistivity.

TABLE 6

| | Content (atm %) | | Volume resistivity (Ω · cm) |
|---|---|---|---|
| | P | Al | |
| Example 1 | — | 0.49 | $4.8 \times 10^{-3}$ |
| Example 5 | 0.041 | 0.49 | $4.3 \times 10^{-3}$ |
| Comparative Example 1 | — | — | $0.9 \times 10^{-3}$ |
| Comparative Example 2 | 0.050 | — | $0.9 \times 10^{-3}$ |

The invention claimed is:

1. A copper powder for conductive paste comprising a plurality of copper particles, wherein each copper particle contains 0.07 to 10 atomic % Al and containing 0.01 to 0.3 atomic % P (phosphorus) inside each copper particle.

2. The copper powder for conductive paste according to claim 1, wherein Al/P (atomic ratio) is 4 to 200.

3. The copper powder for conductive paste according to claim 2, prepared by an atomizing method.

4. The copper powder for conductive paste according to claim 2, wherein a difference between 245° C. and 600° C. in weight change ratio (Tg(%))/specific surface area (SSA) is 1 to 30%/m²/cm³.

5. A conductive paste containing copper powder for conductive paste according to claim 2.

6. The copper powder for conductive paste according to claim 1, wherein a difference between 245° C. and 600° C. in weight change ratio (Tg(%))/specific surface area (SSA) is 1 to 30%/m²/cm³.

7. A conductive paste containing copper powder for conductive paste according to claim 6.

8. The copper powder for conductive paste according to claim 1, prepared by an atomizing method.

9. A conductive paste containing copper powder for conductive paste according to claim 8.

10. The copper powder for conductive paste according to claim 1, wherein a difference between 245° C. and 600° C. in weight change ratio (Tg(%))/specific surface area (SSA) is 1 to 30%/m²/cm³.

11. A conductive paste containing copper powder for conductive paste according to claim 1.

* * * * *